United States Patent
Low et al.

(10) Patent No.: US 8,373,649 B2
(45) Date of Patent: Feb. 12, 2013

(54) TIME-OVERLAPPING PARTIAL-PANEL UPDATING OF A BISTABLE ELECTRO-OPTIC DISPLAY

(75) Inventors: Yun Shon Low, Richmond (CA); John Peter van Baarsen, Delta (CA); Takahide Ohkami, Newton, MA (US)

(73) Assignees: Seiko Epson Corporation, Tokyo (JP); E Ink Corporation, Cambridge, MA (US)

( * ) Notice: Subject to any disclaimer, the term of this patent is extended or adjusted under 35 U.S.C. 154(b) by 937 days.

(21) Appl. No.: 12/101,623

(22) Filed: Apr. 11, 2008

(65) Prior Publication Data

US 2009/0256868 A1     Oct. 15, 2009

(51) Int. Cl.
*G09G 3/34* (2006.01)
(52) U.S. Cl. ......................... 345/107; 345/204
(58) Field of Classification Search .................. 345/105, 345/107, 691, 204
See application file for complete search history.

(56) References Cited

U.S. PATENT DOCUMENTS

| | | | |
|---|---|---|---|
| 4,418,346 A | 11/1983 | Batchelder |
| 5,266,937 A | 11/1993 | DiSanto et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,271,823 B1 | 8/2001 | Gordon, II et al. |
| 6,301,038 B1 | 10/2001 | Fitzmaurice et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,866,760 B2 | 3/2005 | Paolini Jr. et al. |
| 6,870,657 B1 | 3/2005 | Fitzmaurice et al. |
| 6,950,220 B2 | 9/2005 | Abramson et al. |

(Continued)

FOREIGN PATENT DOCUMENTS

| | | |
|---|---|---|
| JP | 2006-516747 | 7/2006 |
| JP | 2007-249231 | 9/2007 |

(Continued)

*Primary Examiner* — Hong Zhou (57) ABSTRACT

A method for updating two or more regions of the display area of a bistable, electro-optic display device comprises selecting at least one first waveform for at least one pixel of a first region; (b) selecting at least one second waveform for at least one pixel of a second region; (c) updating the first region by generating and providing the first waveform to the at least one pixel of the first region; and (d) updating the second region by generating and providing the second waveform to the at least one pixel of the second region, wherein the first and second updates at least partially coincide in time. The first waveform is selected from a first drive scheme for use in a first update mode having a first period. The second waveform is selected from second a drive scheme for use in a second update mode having a second period.

29 Claims, 7 Drawing Sheets

U.S. PATENT DOCUMENTS

| | | | |
|---|---|---|---|
| 6,995,550 | B2 | 2/2006 | Jacobson et al. |
| 7,012,600 | B2 | 3/2006 | Zehner et al. |
| 7,034,783 | B2 | 4/2006 | Gates et al. |
| 7,119,772 | B2 | 10/2006 | Amundson et al. |
| 7,193,625 | B2 | 3/2007 | Danner et al. |
| 7,259,744 | B2 | 8/2007 | Arango et al. |
| RE39,898 | E | 10/2007 | Nally et al. |
| 7,327,511 | B2 | 2/2008 | Whitesides et al. |
| 7,733,311 | B2 | 6/2010 | Amundson et al. |
| 7,800,580 | B2 * | 9/2010 | Johnson et al. ............... 345/107 |
| 2002/0075556 | A1 | 6/2002 | Liang et al. |
| 2002/0180687 | A1 | 12/2002 | Webber |
| 2005/0024353 | A1 | 2/2005 | Amundson et al. |
| 2005/0151709 | A1 | 7/2005 | Jacobson et al. |
| 2005/0152018 | A1 | 7/2005 | Abramson et al. |
| 2005/0179642 | A1 | 8/2005 | Wilcox et al. |
| 2005/0212747 | A1 | 9/2005 | Amundson |
| 2005/0219184 | A1 | 10/2005 | Zehner et al. |
| 2005/0280626 | A1 | 12/2005 | Amundson et al. |
| 2006/0038772 | A1 | 2/2006 | Amundson et al. |
| 2006/0139305 | A1 | 6/2006 | Zhou et al. |
| 2006/0139310 | A1 | 6/2006 | Zehner et al. |
| 2006/0139311 | A1 | 6/2006 | Zehner et al. |
| 2006/0232531 | A1 * | 10/2006 | Amundson et al. ............. 345/87 |
| 2006/0262060 | A1 | 11/2006 | Amundson |
| 2006/0290652 | A1 | 12/2006 | Zhou et al. |
| 2007/0085819 | A1 * | 4/2007 | Zhou et al. ..................... 345/107 |
| 2007/0126748 | A1 * | 6/2007 | Jeffrey et al. ................. 345/559 |
| 2007/0205978 | A1 | 9/2007 | Zhou et al. |
| 2008/0024482 | A1 | 1/2008 | Gates et al. |
| 2008/0048969 | A1 | 2/2008 | Whitesides et al. |
| 2008/0055327 | A1 * | 3/2008 | Rai et al. ....................... 345/558 |
| 2008/0238894 | A1 * | 10/2008 | Ng et al. ....................... 345/204 |

FOREIGN PATENT DOCUMENTS

| | | |
|---|---|---|
| WO | 0201281 A3 | 1/2002 |
| WO | 2004/066254 | 8/2004 |

* cited by examiner

TIME-OVERLAPPING PARTIAL-PANEL UPDATING OF A BISTABLE ELECTRO-OPTIC DISPLAY

REFERENCE TO RELATED APPLICATIONS

This application is related to:
(a) U.S. Pat. No. 6,504,524;
(b) U.S. Pat. No. 6,512,354;
(c) U.S. Pat. No. 6,531,997;
(d) U.S. Pat. No. 6,995,550;
(e) U.S. Pat. No. 7,012,600, and the related copending application Ser. Nos. 11/160,455; 11/307,886; and 11/307,887;
(f) U.S. Pat. No. 7,034,783;
(g) U.S. Pat. No. 7,119,772;
(h) U.S. Pat. No. 7,193,625;
(i) U.S. Pat. No. 7,259,744;
(j) U.S. Patent Publication No. 2005/0024353;
(k) U.S. Patent Publication No. 2005/0179642;
(l) U.S. Patent Publication No. 2005/0212747;
(m) U.S. Pat. No. 7,327,511;
(n) U.S. Patent Publication No. 2005/0152018;
(o) U.S. Patent Publication No. 2005/0280626;
(p) U.S. Patent Publication No. 2006/0038772;
(q) U.S. Patent Publication No. 2006/0262060;
(r) U.S. Patent Publication No. 2008/0024482; and
(s) U.S. Patent Publication No. 2008/0048969.

The entire contents of these copending patents and patent publications, and of all other U.S. patents and published and copending applications mentioned below, are herein incorporated by reference.

TECHNICAL FIELD

The present invention relates to methods for driving electro-optic displays, especially bistable, electro-optic displays, and to apparatus for use in such methods. More specifically, this invention is especially, but not exclusively, intended for use with particle-based electrophoretic displays in which one or more types of electrically charged particles are present in a fluid and are moved through the fluid under the influence of an electric field to change the appearance of the display.

BACKGROUND

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. Pub. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display.

Several types of electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode. Nanochromic films of this type are described, for example, in U.S. Pat. Nos. 6,301,038; 6,870.657; and 6,950,220. This type of medium is also typically bistable.

Another type of electro-optic display is an electro-wetting display. It is shown in copending application Ser. No. 10/711, 802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids.

One type of electrophoretic display employs encapsulated electrophoretic media. Encapsulated electrophoretic media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes.

It has been recognized that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. Thus, the resulting display can be flexible. Further, because the display medium can be printed (using a variety of methods), the display itself can be made inexpensively.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 6,130,774; 6,172,798; 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R0)1/3 - 16,$$

where R is the reflectance and R0 is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme {"MDS") which effects transitions only between two gray levels, the MDS providing quicker rewriting of the display than the GSDS. The MDS may be used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

While the use of multiple drive schemes to provide quicker rewriting of a particular region of a display is beneficial, further improvements in the responsiveness of the display would be advantageous. Any such improvements would increase the applicability of the display for interactive applications.

SUMMARY

The inventors have observed that many current display controllers can only make use of one updating scheme at any given time. Moreover, the inventors have recognized that many current display controllers can only update one region of the display at any given time. As a result, the display is not responsive enough to react to rapid user input, such as keyboard input or scrolling of a select bar. This limits the applicability of the display for interactive applications.

According to the principles of the invention, the image displayed on a bistable, electro-optic display device may be divided into two or more regions and each of the regions may be updated in separate refresh operations. The refresh operation for each region may use a different update mode and the refresh operations may overlap in time. According to the principles of the invention, it is possible to begin updating a first region of the image using a first update mode even while a display refresh operation for refreshing a second region using a second update mode is in progress. Thus, embodiments of the invention permit a new update to begin immediately without having to wait until a current update has finished.

In one embodiment, a display controller for updating two or more regions of the display area of a bistable, electro-optic display device comprises a first and at least one second display pipe. The first display pipe fetches pixel transitions for a first region, fetches a first drive scheme having a first period for the first region, and determines a waveform for at least one pixel of the first region. The at least one second display pipe fetches pixel transitions for a second region, fetches a second drive scheme having a second period for the second region, and determines a waveform for at least one pixel of the second region. The determinations of waveforms by the first display pipe and the at least one second display pipe at least partially coincide in time.

In another embodiment, a bistable, electro-optic display device comprises a display panel having a display area and a display controller for generating waveforms for the display panel according to the principles of the invention.

In yet another embodiment, a method for updating two or more regions of the display area of a bistable, electro-optic display device comprises: (a) selecting at least one first waveform for at least one pixel of a first region of the display area; and (b) selecting at least one second waveform for at least one pixel of a second region of the display area. The first waveform is selected from a first drive scheme for use in a first update mode. The first update mode has a first period. The second waveform is selected from second a drive scheme for use in a second update mode. The second update mode has a second period. In addition, the method further comprises: (c) updating the first region by generating and providing the first waveform to the at least one pixel of the first region; and (d) updating the second region by generating and providing the second waveform to the at least one pixel of the second region, wherein the first and second updates at least partially coincide in time.

This summary is provided to generally describe what follows in the drawings and detailed description and is not intended to limit the scope of the invention. Objects, features, and advantages of the invention will be readily understood upon consideration of the following detailed description taken in conjunction with the accompanying drawings.

BRIEF DESCRIPTION OF THE DRAWINGS

Wherever possible, the same reference numbers are used in the drawings and the description to refer to the same or like parts.

DETAILED DESCRIPTION

There is a technical problem with known uses of update modes in bistable, electro-optic display devices. Specifically, refresh operations that use different update modes must be used sequentially. Once a display refresh operation has begun using one of the update modes, it is not possible to begin another refresh operation using another update mode until the refresh operation in progress has finished. Visual feedback on the display may be provided in response to a user input. For example, when the user aligns a cursor with a selection button rendered on the display, the selection button may change its optical appearance, indicating that the button has been selected. If an update operation is in progress at the time that the user provides input to an interface device, the associated visual feedback does not appear instantaneously. The update of a region of the display area, e.g., the selection button, which provides visual feedback must wait until an update operation in progress has finished. The refreshing of the visual feedback region must wait for the in progress refresh operation to finish, even if the feedback region is a relatively small proportion of the full image. Moreover, the refreshing of the visual feedback region must wait, even if the visual feedback region is to be refreshed using a relatively fast drive scheme, e.g., MDS and the update in progress is using a relatively slow drive scheme, e.g., GSDS.

According to the principles of the invention, the image displayed on a bistable, electro-optic display device may be divided into two or more regions and each of the regions may be updated in separate refresh operations. Each refresh operation may use a different update mode and the refresh operations may overlap in time. According to the principles of the invention, it is possible to begin updating a first region of the image using a first update mode even while a display refresh operation for refreshing a second region using a second update mode is in progress. Thus, embodiments of the invention permit a new update to begin immediately without having to wait until a current update has finished.

Display controllers for driving bistable, electro-optic display devices, bistable, electro-optic display devices, and methods that embody the principles of the invention have the advantage that particular regions of the display area may be updated in less time than with prior art techniques. In addition, embodiments that incorporate principles of the invention have the advantage of minimizing the latency between user input and visual user feedback.

Figure 1:
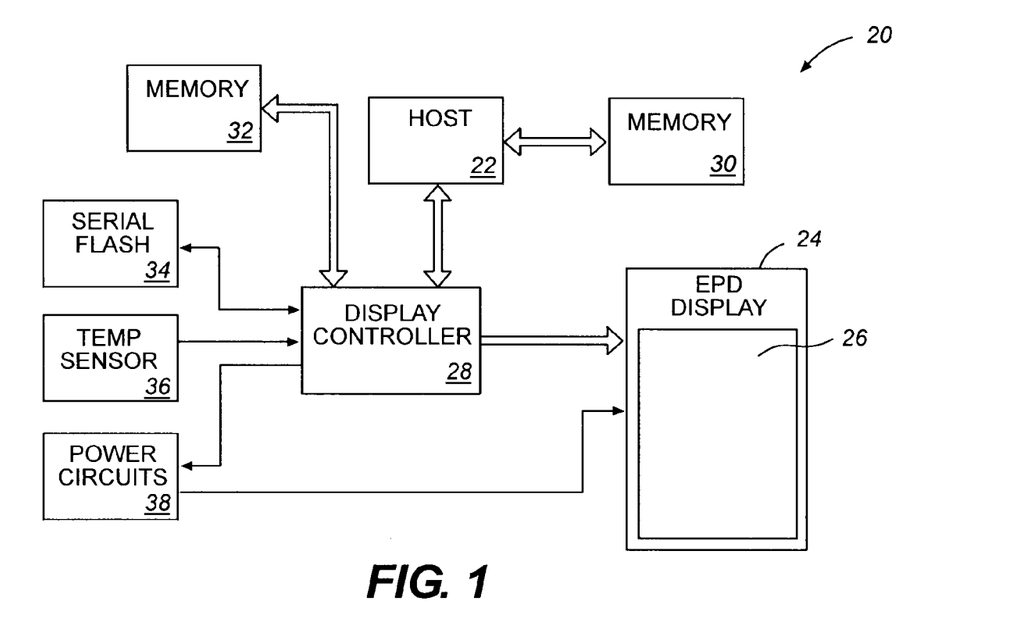
FIG. 1 is a block diagram of one embodiment of a system embodying principles of the invention that includes an exemplary display device having a bistable, electro-optic display panel, an exemplary display controller, and an exemplary display memory.

FIG. 1 shows a display system 20 comprising a host 22, a bistable, electro-optic display device 24 having a display panel 26, a display controller 28, and a system memory 30. The system 20 also includes a display memory 32, a waveform memory 34, a temperature sensor 36, and a display power module 38. The host 22 may be a CPU, DSP, or other device for interfacing with the display controller 28. The display memory 32 may be volatile memory.

Figure 2:
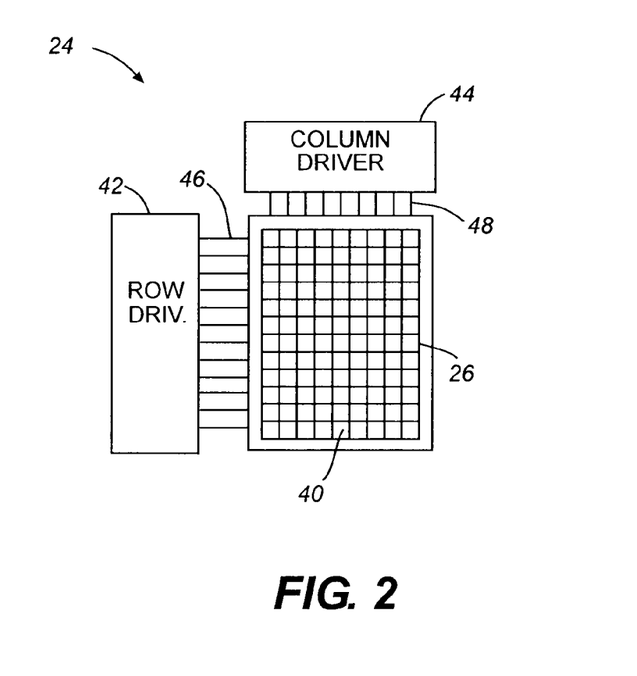
FIG. 2 is a block diagram showing the display device of FIG. 1 in more detail.

FIG. 2 shows the display device 24 in more detail. In one embodiment, the display panel 26 may be an electrophoretic display. In addition, the display panel 26 may be an active matrix or a passively driven electrophoretic display. The display panel 26 includes an array of pixels 40. In one embodiment, each pixel 40 includes an active switching element (not shown), such as a thin-film transistor. The switching elements are selected and driven by row driver 42 and a column driver 44. In operation, the row driver 42 may select row electrodes 46, turning on all of the switching elements in the row. The column driver 44 may provide an impulse data signal on a selected column electrode 48, thereby providing an impulse voltage to the pixel located at the intersection of selected row and column electrodes.

Figure 3:
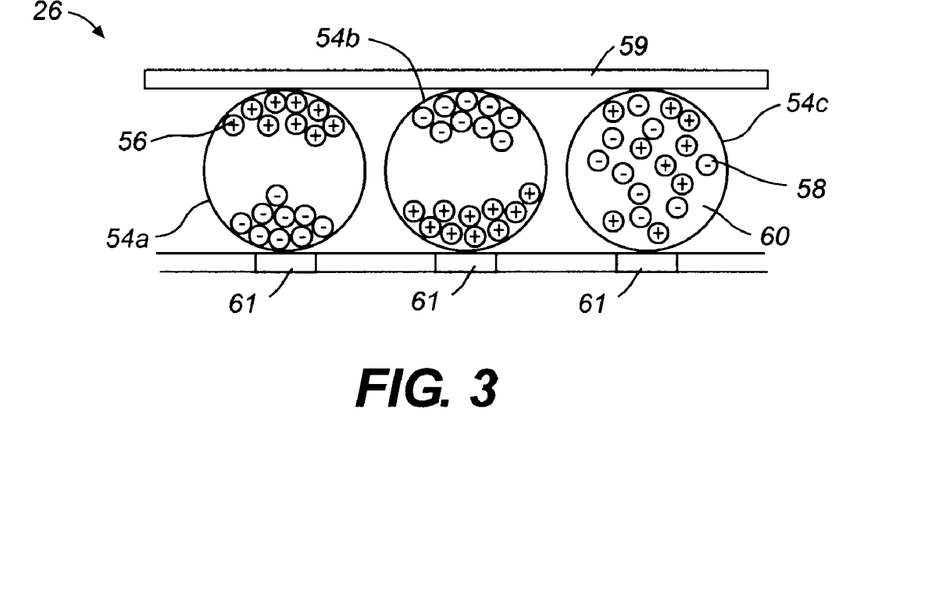
FIG. 3 is a cross-sectional view of a portion of the display panel of FIG. 1.

FIG. 3 is a schematic diagram showing a simplified portion of the electrophoretic display 26 in cross-section. One or more microcapsules 54 are sandwiched between the pixel electrodes 59, 61. The pixel electrode 59 may be transparent. In practice, each pixel may correspond with two or more microcapsules. Each microcapsule 54 may include positively charged white particles 56 and negatively charged black particles 58 suspended in a fluid 60. The pixel electrode 59 may be held at a predetermined voltage, and the row and column electrodes 46, 48 may be used to control the voltage applied to the electrodes 61. The pixel electrodes 59, 61 may be used to establish an electric field across the microcapsules 54 associated with a particular pixel. When the electric field is positive, the white particles 56 move toward the electrode 46, which results in the pixel becoming whiter in appearance. On the other hand, when the electric field is negative, the black particles 58 move toward the electrode 46, which results in the pixel becoming blacker in appearance. The microcapsule 54a is a simplified representation of a pixel that is completely white and the microcapsule 54b is a simplified representation of a pixel that is completely black. In addition, the microcapsule 54c illustrates a pixel having a gray-scale value other than completely white or black, i.e., gray.

To generate a pixel having a particular optical appearance, e.g., black, white, or a gray state, a waveform is typically applied to the pixel electrodes. The particular waveform depends on, among other things, the desired new optical appearance. When the exemplary display panel 26 is updated, a waveform may be applied to each pixel of the display. Because the current and new optical states differ from pixel to pixel, the applied waveforms will also differ from pixel to pixel.

A drive scheme describes a set of waveforms sufficient to effect all possible transitions between gray levels for a specific display. Because each refresh operation uses a drive scheme, the phrase "update mode" may be used herein with reference to a refresh operation that uses a particular a drive scheme. Specifically, a GSDS update mode uses the GSDS drive scheme, and an MDS update mode uses an MDS drive scheme. Reference is also made below to a pen drive scheme. Similarly, a pen update mode uses the pen drive scheme. (In a pen update the new optical state of the pixels in the region to be updated may be defined by a user input produced with a pen, a mouse, a touch screen, or other input device.) In addition, the phrases "overlap in time" and "time overlapping" are intended to refer to time periods that at least partially coincide in time.

Each update mode has an update mode period. With respect to exemplary MDS and GSDS update modes, the MDS mode has a shorter period than the GSDS mode. While a particular pixel may undergo a black-to-white or white-to-black optical transition in either mode, it should be noted that the waveform used to drive the pixel may not be identical in both modes. For example, when a pixel is driven from black-to-white or from white-to-black in GSDS update mode, the waveform may include pulses (or resting periods) in addition to those used in MDS update mode in order to mitigate effects on neighboring pixels. In other words, the waveform used for a particular pixel transition in one mode may be different from the waveform used in another update mode for driving the same pixel transition. Likewise, the length of the waveform period for a particular pixel transition may vary depending on the update mode used.

Figure 4:
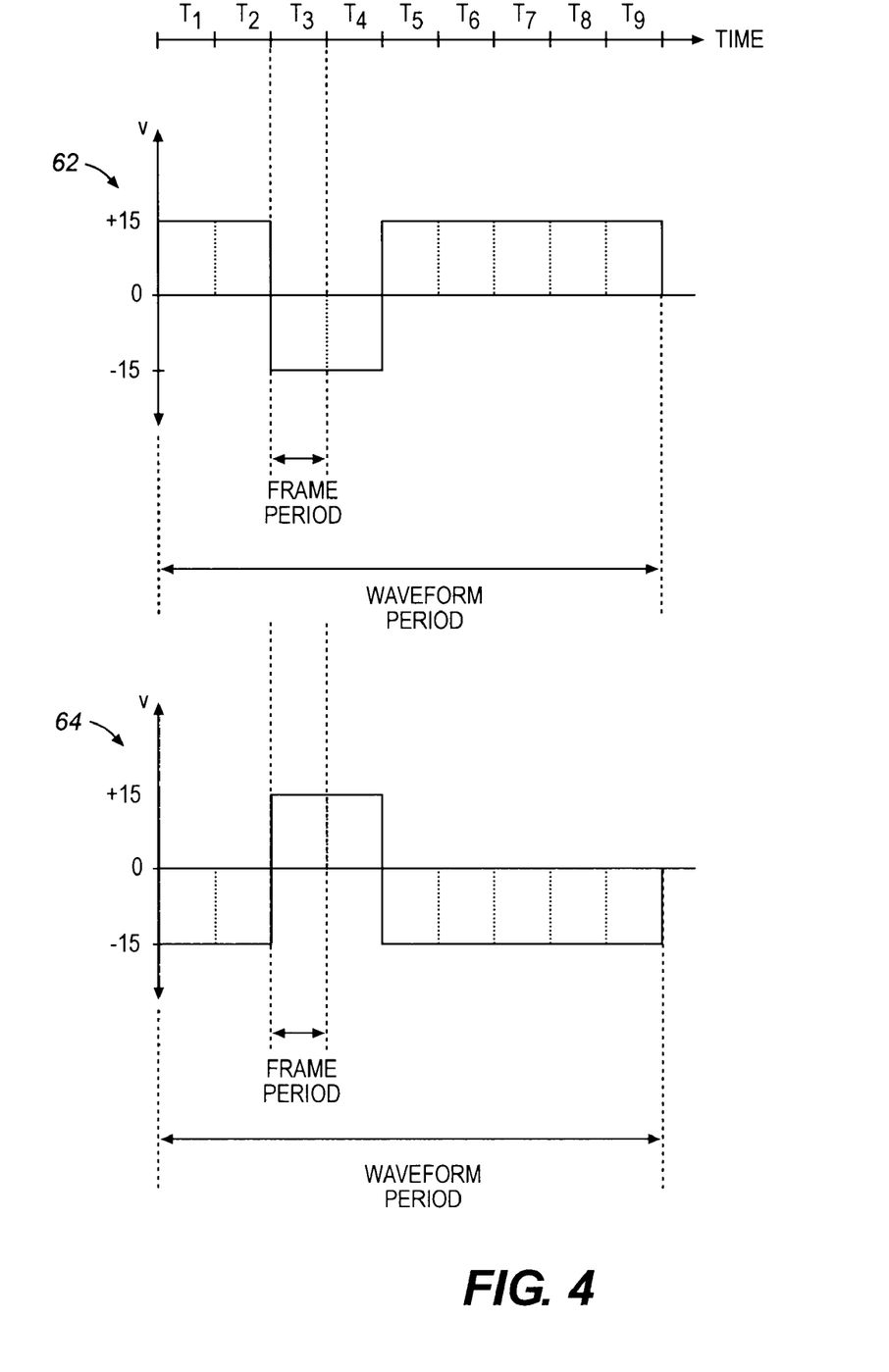
FIG. 4 illustrates exemplary waveforms for driving the display panel of FIG. 1.

Example waveforms 62, 64 are shown in FIG. 4. The waveforms 62, 64 are provided for the purpose of illustrating features of waveforms generally and are not intended to depict actual waveforms. The time period in which a single pulse is asserted is referred to as the frame period. The time associated with the entire sequence of pulses is referred to the waveform period. It is assumed that the waveform 62 is required to change the appearance of a pixel from a white value to a black value. Conversely, it is assumed that the waveform 64 is required to change the appearance of a pixel from a black value to a white value. Each waveform 62, 64 has the same waveform period.

In one embodiment, the display panel 26 supports and the display controller 28 provides at least three different update modes: (a) GSDS mode (GU); (b) pen update mode (PU); and (c) MDS mode (MU). The pen update mode may be used to effect transitions having an initial state that includes all possible gray levels and a final state comprised of black or white. In one embodiment, the display panel 26 and the display controller 28 support pixels defined by between one and eight bits. Eight-bit gray scale pixel values along with approximate display update times are shown in Table 1 below.

TABLE 1

| Mode | Current Pixel | Next Pixel | Waveform Period |
| --- | --- | --- | --- |
| GU | 0-255 | 0-255 | ~800 mS |
| PU | 0-255 | 0 or 255 | ~260 mS |
| MU | 0 or 255 | 0 or 255 | ~260 mS |

Figure 5:
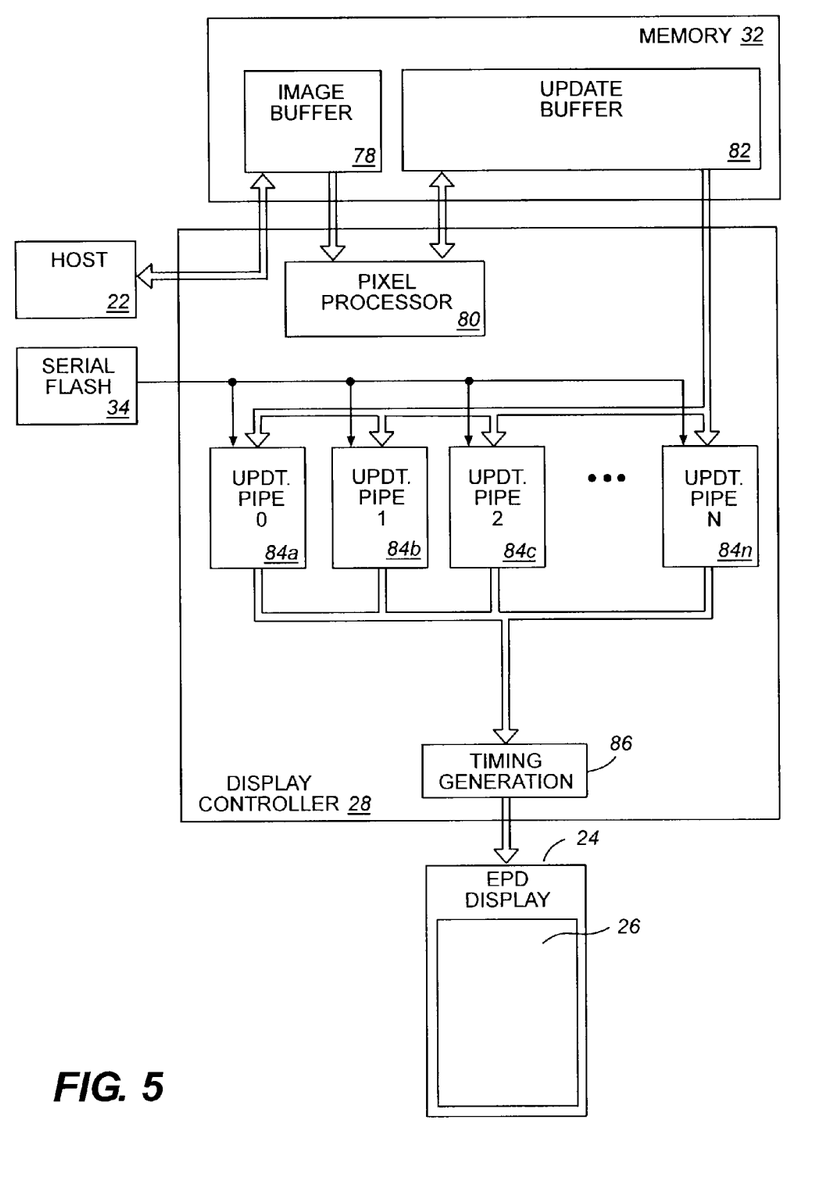
FIG. 5 is a block diagram showing the display memory and display controller of FIG. 1 in greater detail, the display controller including a plurality of update pipes.

Turning now to FIG. 5, the display controller 28 and display memory 32 are shown in greater detail. The terms "update pipe" and "display pipe" are used interchangeably herein. The display memory 32 includes an image buffer 78 and an update buffer 82. The host 22 may store an image or a portion of an image in the image buffer 78, which may be pixel data. The update buffer 82 stores pixel transitions with respect to a current and next image. The update buffer 82 may be accessed by internal components of the display controller 28, such as a pixel processor 80 or one of two or more update pipes 84. In one embodiment, the display controller 28 includes 16 update pipes 84. In one embodiment, each update pipe 84 may be associated with one predetermined sub-area or region of a full image. However, this is not critical; alternative methods may be employed for selecting an update pipe 84 to perform a refresh operation. The outputs of the update pipes 84 are coupled with a timing generation unit 86. During an update operation, the timing generation unit 86 steps through the pixel locations of successive frames in raster order. The timing generation unit 86 accepts waveform data from the display pipes and provides waveform data to the display power module 38 and the display 24 in raster order and according to the timing requirements of the display device 24.

The storing of image data in the image buffer 78 does not trigger a display update. The display 24 may be periodically updated at intervals that are typically much longer than an LCD refresh period, e.g., on the order of minutes. Otherwise, the display 24 is typically refreshed only in response to a "display image" or a "display partial image" command.

The functions of the pixel processor 80 and update pipes 84 may be understood by reviewing an exemplary display update operation. After the host 22 finishes storing pixel data for the image to be displayed next, the host may issue a display image command. The pixel processor 80 responds by reading the image data stored in the image buffer 78. The pixel processor 80 also reads image data for an image currently being displayed from the update buffer 82. The pixel processor 80 synthesizes new and currently displayed image data, which it then stores in the update buffer 82. In creating synthesized image data, the pixel processor 90 pairs up pixels in corresponding locations of the current and new image. The current and new pixels corresponding with a particular display location together form a pixel transition, e.g., black-to-white. Each synthesized pixel datum or pixel transition is subsequently used to locate the appropriate waveform needed to drive a display pixel to a new optical value.

When the pixel processor 80 has completed the pixel synthesis process, the pixel transitions for all of the pixel locations in the new image are known. With this information an update mode may be selected. Where the new image is defined such that it has two or more regions, an update mode may be selected for each of the regions. In addition, each of the regions is assigned to one of the update pipes 84.

An update pipe 84 reads synthesized pixel data for its assigned region from the update buffer 82 and generates waveforms for the pixels of the specified region. The update pipes 84 fetch synthesized pixel data for their respective regions and generate waveforms independent of one another and in parallel.

Figure 11:
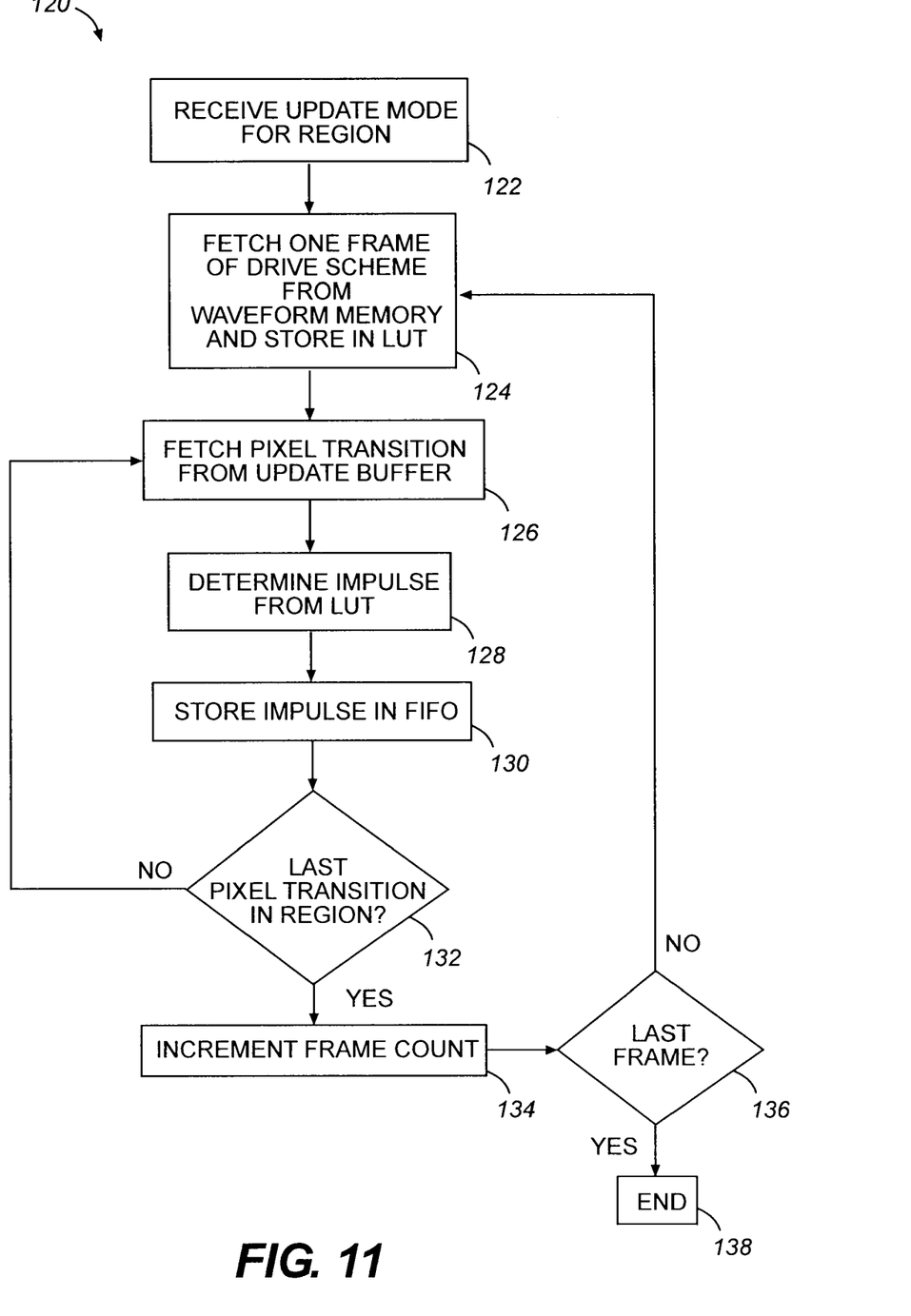
FIG. 11 is a flow diagram of an exemplary process used by the update pipes of FIG. 5 to determine impulses.

FIG. 11 is a flow diagram of an exemplary process that may be used by an update pipe 84 to determine impulses. When the exemplary display panel 26 is updated, a waveform may be applied to each pixel of the display. As shown in FIG. 11, an update pipe 84 generates impulses for each pixel of their respective regions one frame at a time. An update pipe 84 receives the update mode for its assigned region (step 122). The pipe fetches one frame of the corresponding drive scheme from the waveform memory (step 124). Referring back to FIG. 4, examples of the single pulses generated during each frame are shown. For example, a −15V pulse for waveform 62 and a +15V pulse for waveform 64 may be fetched in frame period T3. If a drive scheme includes 16 or 256 waveforms, 16 or 256 impulses would be fetched. In addition, the pulses for the current frame period are stored in a LUT 104. A pixel transition corresponding with the first raster ordered pixel in the assigned region is fetched from the update buffer (step 126). An impulse is determined for the fetched pixel transition from the LUT (step 128). The impulse is stored in a FIFO 108 (step 130). A determination is made if the current pixel transition corresponds with the last pixel location in the region (step 132). If not the last pixel location, steps 126-132 are repeated for each additional pixel. If the current pixel is the last pixel, a frame count is incremented (step 134), and a determination is made if the current frame is the last frame in the drive scheme (each drive scheme has a predetermined number of frames). If not the last frame period, steps 124-134 are repeated for each frame period of the drive scheme.

Figure 6:
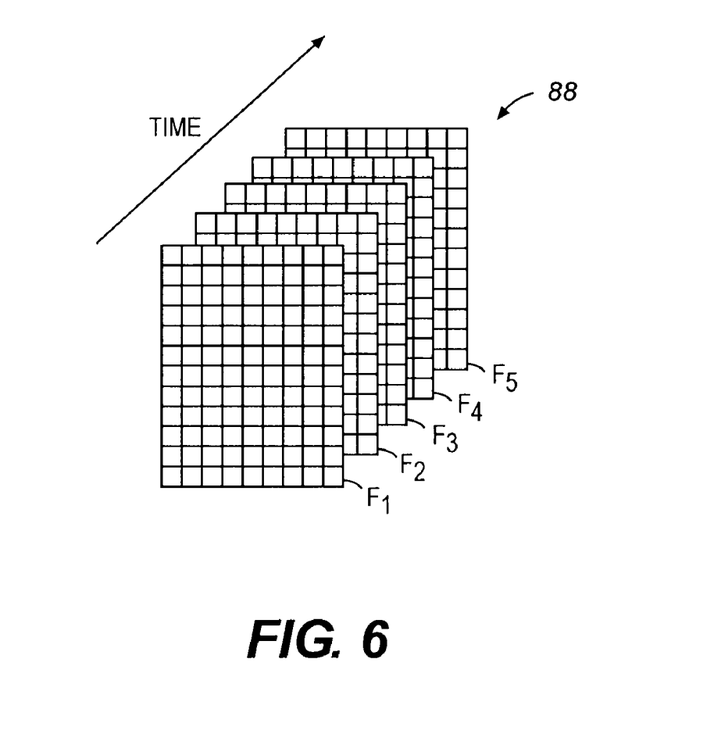
FIG. 6 is a graphic representation of a sequence of frames for updating the display panel of FIG. 1.

To further illustrate the exemplary process that an update pipe 84 may use to determine impulses, FIG. 6 shows a sequence of frames 88. In frame F1, the first drive pulses of the respective waveforms for the pixels of the new image are generated. The second pulses are generated in frame F2, and so on. Assume that the update period for the new image is five frames. At the end of the fifth frame, the image update will be complete.

Figure 7:
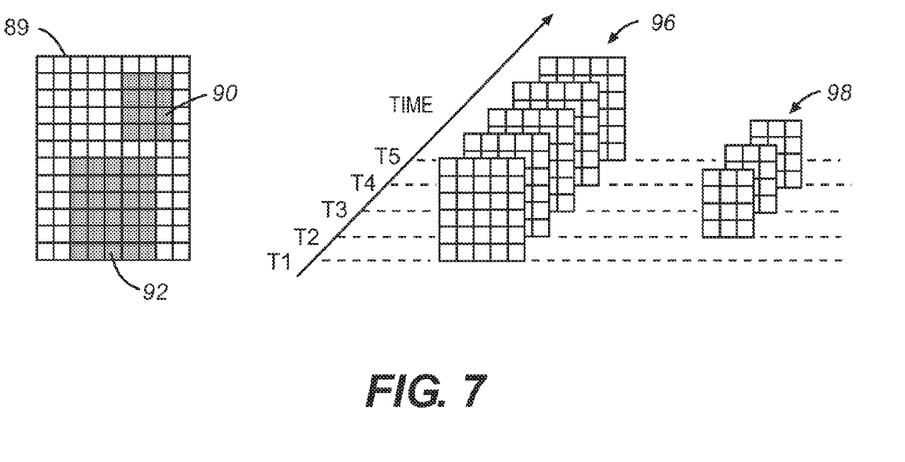
FIG. 7 is a graphic representation of an image having regions and a sequence of frames for respectively updating each region.

The update pipes 84 generate waveforms for their respective regions independently. FIG. 7 shows an image 89 having sub-areas 90 and 92, and a sequence of frames 96, 98 for respectively updating each sub-area. Assume that the regions 90 and 92 are to be updated using different update modes. Further, assume that the update periods for the two update modes are different: the update period for the sub-area 92 is five frames, while the update period for the sub-area 90 is three frames. In frame F1, the first pulses of the respective waveforms for the pixels of region 92 are generated by a first update pipe 84a. In frame F2, the second pulses of the respective waveforms for the pixels of region 92 are generated by the first update pipe 84a. Additionally, in frame F2, the first pulses of the respective waveforms for the pixels of region 90 are generated by a second update pipe 84b. FIG. 7 illustrates that the first and second update pipes 84a, 84b generate waveforms for different regions in time periods that overlap with one another.

To generate waveforms, each pixel transition is used as a waveform lookup table index. Referring to FIG. 5, the waveforms used for a number of different drive schemes are stored in the waveform memory 34. The waveform memory 34 may include a different set of waveforms for each update mode for each of a variety of temperatures. In one embodiment, the waveform memory 34 may be a flash memory device.

Figure 10:
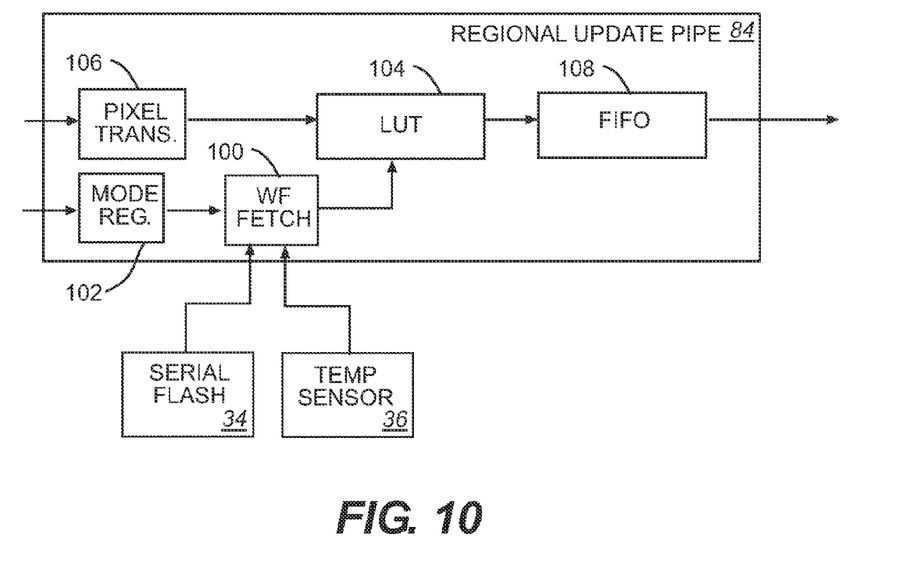
FIG. 10 is block diagram of one of the exemplary update pipes of FIG. 5.

FIG. 10 is block diagram illustrating of one of the exemplary update pipes in greater detail. A waveform fetching unit 100 in the update pipe 84 locates the set of all possible waveforms in the waveform memory 34 corresponding with a designated update mode stored in a mode register 102 and a current temperature. For each frame in the update mode period, the fetching unit 100 copies all possible impulses for the appropriate drive scheme for the current frame and stores the current frame impulses in the lookup table 104. In addition, for each frame, the update pipe fetches pixel transitions for its assigned region in raster order, storing each pixel transition in a register 106. Using the current frame impulse data stored in the lookup table 104, the update pipe 84 locates impulse data for the current frame corresponding with the pixel transition stored in the register 106 and stores the impulse data in the first-in-first-out memory ("FIFO") 108. The FIFO 108 is provided so that waveform data may be generated and buffered ahead of when it will be needed by the timing generation unit 86.

The timing generation unit 86 steps through the locations in an image in raster order every frame period, selecting impulse data corresponding with the current pixel position from one of the update pipes 84. The timing generation unit 86 is provided with coordinate locations of each designated region along with the update pipe 84 to which the region has been assigned. The timing generation unit 86 provides the selected impulse data to the display panel 26 and the display power module 38.

One advantage of embodiments of the present invention is that the image buffer 78 can be accessed by the host 22 at any time during a refresh operation, except during the pixel synthesis portion of the refresh operation. The pixel synthesis portion of an update operation typically requires a small part of the total time needed to refresh the display. As mentioned, a GSDS update may take on the order of 800 milliseconds. In contrast, the pixel synthesis operation typically requires something on the order of tens of milliseconds. Accordingly, the host 22 typically does not have to wait or does not have to wait long in order to initiate a new regional update.

Another advantage of embodiments of the present invention is that as many different update modes or drive schemes as desired may be simultaneously used. While it is possible, for example, to update first and second regions at times that partially or completely coincide using the same drive scheme, this is not required. For instance, a first region may be updated in a GSDS mode, a second region may be updated in a MDS mode, and a third region may be updated in a pen mode, wherein the three updates overlap in time.

Yet another advantage of embodiments of the present invention is that drive schemes are not stored in the display memory 32, but are instead stored in the wave form memory 34. As mentioned, the display memory 32 may be a volatile memory, such as a RAM, e.g., an SRAM or a DRAM. This permits rapid access by the host or internal components of the display controller to the image and update buffers. In addition, by storing drive schemes in the wave form memory, which may be a non-volatile memory, such as a Flash memory, the waveforms are not lost when power is removed. In addition, the waveform memory may be removable so that field updating of drive schemes is possible.

Figure 8:
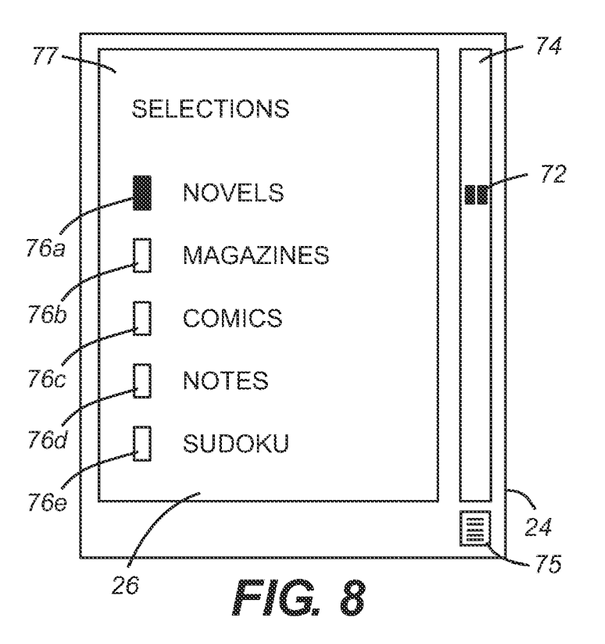
FIG. 8 is a depiction of an exemplary image rendered on the display panel of FIG. 1 at a particular time.
Figure 9:
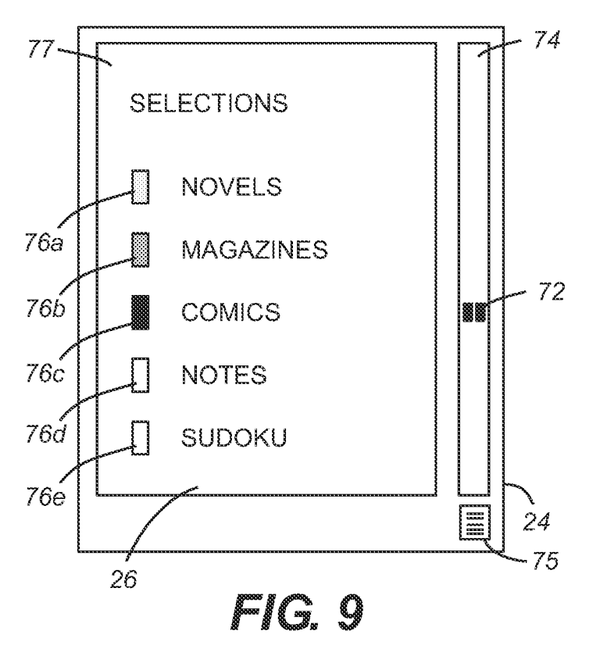
FIG. 9 is a second depiction of an exemplary image of FIG. 8 at a subsequent time.

An example of how one embodiment of the present invention solves the problem of delayed visual feedback in response to a user input is shown in FIGS. 8 and 9. FIG. 8 shows an exemplary image rendered on the display panel 28 at a particular time. The display panel 28 additionally includes a cursor 72 that slides vertically in a cursor bar 74 in response to movement of a control wheel 75. The exemplary image includes six regions 76a-76e, and 77. When the cursor 72 is aligned horizontally with one of the regions 76, the region changes from white, indicating an "off" state, to black, signifying an "on" state. Ideally, the changes in appearance from on-to-off and versa should be perceived as occurring instantaneously. As a user moves the cursor 72 vertically from top to bottom, each successively lower region 76 should turn black while the previously selected region above should turn white. However, it has been found to be visually acceptable to have the previous selection button dissolve to the off state less than instantaneously, provided the newly selected button turns on with no perceptible delay. FIG. 9 shows an exemplary image rendered on the display panel 28 at a time subsequent to the time of FIG. 8. As shown in FIG. 9, at substantially the same time that the new button 76c is selected, the new button 76c turns black while the immediately previous selection button 76b has achieved about 50 percent of its new appearance value, and the previous selection button 76a has achieved about 100 percent of its new appearance value of white.

Consider a scenario where the cursor 72 travels relatively quickly down the page in response to user input. Each time the cursor 72 travels from one selection button to the next, two "display partial image" commands are initiated. The first display partial image command is to turn off the previous control button. The second display partial image command is to turn on the current control button. Because prior art bistable, electro-optic displays and display controllers process each update to completion before beginning a new frame update, the selection button 76 currently aligned with the cursor 72 will not be turned on at a time that is perceived as instantaneous with the time of alignment. The reason is that the display will still be performing the first partial image update for turning off the previous selection button when the cursor 72 comes into alignment with the current control button. Only when the first display partial image command has finished can the display proceed to turn on the current selection button 76. Further, as the cursor 72 moves down the page, the delay may become longer and more pronounced. For example, by the time the cursor is aligned with selection button 76e, the series of display image commands for updating selection buttons may be queued up several buttons deep.

In contrast, a bistable, electro-optic display or a bistable, electro-optic display controller according to the principles of the present invention minimizes any delay in visual feedback in response to movement of the scroll wheel 77. When the cursor 72 moves away from a first selection button 76b, a first regional update may be initiated. Then when the cursor 72 is aligned with a second selection button 76c, a second regional update may be initiated. The second regional update may begin immediately even though the first regional update has started and has not finished. When the cursor 72 moves away from a second selection button 76c, a third regional update may be initiated to turn the second button off. Moreover, when the cursor 72 is aligned with a third selection button 76d, a fourth regional update may be initiated. The fourth regional update may begin immediately even though the third regional update has started and has not finished. It may be seen from this example that the first and second, and the third and fourth updates overlap in time, i.e., they are performed in parallel.

It will be appreciated that the system 20 may include components in addition to those described above. In addition, the display controller 26 may perform may include additional modules, units, or components. In order to not needlessly complicate the present disclosure, only modules, units, or components believed to be necessary for understanding the principles of the claimed inventions have been described.

One embodiment of the present invention is directed to a display device having an array of electrophoretic pixels. The pixel array may include an array of active elements such as thin-film transistors. In addition, the display device may include circuitry for driving row and column electrodes. Moreover, the display device may include one of more of components described above as being included in the exemplary display controller 28. In particular, the display device may include an image buffer 78, an update buffer 82, a pixel processor 80, one or more update pipes 84, and a timing generation unit 86.

In one embodiment, the display controller 28 or the display 24 may perform some or all of the operations and methods described in this description by executing instructions that are stored in or on machine-readable media. In addition, other units in the system 20 may perform some or all of the operations and methods described in this description by executing instructions that are stored in or on machine-readable media.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

We claim:

1. A method for updating two or more regions of a display area of a bistable, electro-optic display device, comprising:

(a) selecting at least one first waveform for at least one pixel of a first region of the display area, the first waveform being selected from a first drive scheme for use in a first update mode, the first update mode having a first period including a plurality of first frame periods;

(b) selecting at least one second waveform for at least one pixel of a second region of the display area, the second waveform being selected from a second drive scheme for use in a second update mode, the second update mode having a second period including a plurality of second frame periods;

(c) updating the first region by generating and providing the first waveform to the at least one pixel of the first region; and (d) updating the second region by generating and providing the second waveform to the at least one pixel of the second region, wherein the first waveform is generated by fetching a pixel transition from an update buffer during each of the plurality of first frame periods, and by utilizing the pixel transition to access a first lookup table that stores data of the first drive scheme for one of the plurality of first frame periods, wherein the second waveform is generated by fetching a pixel transition from the update buffer during each of the plurality of second frame periods, and by utilizing the pixel transition to access a second lookup table that stores data of the second drive scheme for one of the plurality of second frame periods, wherein, in each of the frame periods, data corresponding to only one frame period among the data of the first drive scheme are stored in the first look up table, and data corresponding to only the one frame period among the data of the second drive scheme are stored in the second lookup table, and wherein the first and second periods at least partially coincide in time, and wherein updating the second region overlaps in time with updating the first region.

2. The method of claim 1, wherein the first and second periods are different.

3. The method of claim 1, wherein updating the first region starts at a first time and updating the second region starts at a second time, and the first and second times are different.

4. The method of claim 1, wherein the first drive scheme is a gray scale drive scheme and the second drive scheme is a monochrome drive scheme.

5. The method of claim 1, wherein the first drive scheme is a gray scale drive scheme and the second drive scheme is a pen drive scheme.

6. The method of claim 1, wherein the first drive scheme is a monochrome drive scheme and the second drive scheme is a pen drive scheme.

7. The method of claim 1, wherein the display device is an electrophoretic display device.

8. The method of claim 7, wherein the display device is an encapsulated electrophoretic display device.

9. The method of claim 8, wherein the display device is an active matrix display device.

10. A display controller for updating two or more regions of a display area of a bistable, electro-optic display device, comprising:
a first display pipe to fetch pixel transitions for a first region, to fetch a first drive scheme having a first period for the first region, and to determine a first waveform for at least one pixel of the first region, the first period including a plurality of first frame periods;
at least one second display pipe to fetch pixel transitions for a second region, to fetch a second drive scheme having a second period for the second region, and to determine a second waveform for at least one pixel of the second region, the second period including a plurality of second frame periods, wherein the first display pipe comprises a first lookup table that stores data of the first drive scheme for one of the plurality of first frame periods, and determines the first waveform by accessing the first lookup table using the pixel transition for the one of the plurality of first frame periods, wherein the at least one second display pipe comprises a second lookup table that stores data of the second drive scheme for one of the plurality of second frame periods, and determines the second waveform by accessing the second lookup table using the pixel transition for the one of the plurality of second frame periods, wherein, in each of the frame periods, data corresponding to only one frame period among the data of the first drive scheme are stored in the first lookup table, and data corresponding to only the one frame period among the data of the second drive scheme are stored in the second lookup table, and wherein the determinations of waveforms by the first display pipe and the at least one second display pipe at least partially coincide in time.

11. The display controller of claim 10, wherein the first and at least one second display pipes fetch pixel transitions from an update buffer during each frame.

12. The display controller of claim 10, wherein the first and second periods are different.

13. The display controller of claim 10, wherein the first display pipe starts determining waveforms at a first time and the at least one second display pipe starts determining waveforms at a second time, and the first and second times are different.

14. The display controller of claim 10, wherein the first drive scheme is a gray scale drive scheme and the second drive scheme is a monochrome drive scheme.

15. The display controller of claim 10, wherein the first drive scheme is a gray scale drive scheme and the second drive scheme is a pen drive scheme.

16. The display controller of claim 10, wherein the first drive scheme is a monochrome drive scheme and the second drive scheme is a pen drive scheme.

17. The display controller of claim 10, wherein the display device is an electrophoretic display device.

18. The display controller of claim 17, wherein the display device is an encapsulated electrophoretic display device.

19. The display controller of claim 18, wherein the display device is an active matrix display device.

20. A bistable, electro-optic display device, comprising:
a display panel having a display area; and
a display controller to update two or more regions of the display area, the display controller including:
a first display pipe to fetch pixel transitions for a first region, to fetch a first drive scheme having a first period for the first region, and to determine a first waveform for at least one pixel of the first region, the first period including a plurality of first frame periods;
at least one second display pipe to fetch pixel transitions for a second region, to fetch a second drive scheme having a second period for the second region, and to determine a second waveform for at least one pixel of the second region, the second period including a plurality of second frame periods, wherein the first display pipe comprises a first lookup table that stores data of the first drive scheme for one of the plurality of first frame periods, and determines the first waveform by accessing the first lookup table using the pixel transition for the one of the plurality of first frame periods, wherein the at least one second display pipe comprises a second lookup table that stores data of the second drive scheme for one of the plurality of second frame periods, and determines the second waveform by accessing the second lookup table using the pixel transition for the one of the plurality of second frame periods, wherein, in each of the frame periods, data corresponding to only one frame period among the data of the first drive scheme are stored in the first lookup table, and data corresponding to only the one frame period among the data of the second drive scheme are stored in the second lookup table, and wherein the determinations of waveforms by the first display pipe and the at least one second display pipe at least partially coincide in time.

21. The display device of claim 20, wherein the first and at least one second display pipes fetch pixel transitions from an update buffer during each frame.

22. The display device of claim 20, wherein the first and second periods are different.

23. The display device of claim 20, wherein the first display pipe starts determining waveforms at a first time and the at least one second display pipe starts determining waveforms at a second time, and the first and second times are different.

24. The display device of claim 20, wherein the first drive scheme is a gray scale drive scheme and the second drive scheme is a monochrome drive scheme.

25. The display device of claim 20, wherein the first drive scheme is a gray scale drive scheme and the second drive scheme is a pen drive scheme.

26. The display device of claim 20, wherein the first drive scheme is a monochrome drive scheme and the second drive scheme is a pen drive scheme.

27. The display device of claim 20, wherein the display device is an electrophoretic display device.

28. The display device of claim 27, wherein the display device is an encapsulated electrophoretic display device.

29. The display device of claim 28, wherein the display device is an active matrix display device.

* * * * *